United States Patent
Kusters

(12) 
(10) Patent No.: US 6,379,815 B1
(45) Date of Patent: Apr. 30, 2002

(54) MOULDED ELEMENT, IN PARTICULAR IN THE SHAPE OF A PLATE, WHICH IS A COMPRESSED MIXTURE OF BINDER AND FILLER, A METHOD AND A DEVICE FOR MANUFACTURING SUCH A MOULDED ELEMENTS, AS WELL AS FLOOR PLATES, A SPORTS HALL PROVIDED WITH SUCH FLOOR

(75) Inventor: Wilhelmus Martinus Anthonius Kusters, Venlo (NL)

(73) Assignee: Syntech Holdings B.V., PS Venlo (NL)

( * ) Notice: Subject to any disclaimer, the term of this patent is extended or adjusted under 35 U.S.C. 154(b) by 0 days.

(21) Appl. No.: 09/529,684
(22) PCT Filed: Oct. 12, 1998
(86) PCT No.: PCT/NL98/00584
  § 371 Date: Jul. 27, 2000
  § 102(e) Date: Jul. 27, 2000
(87) PCT Pub. No.: WO99/20444
  PCT Pub. Date: Apr. 29, 1999

(30) Foreign Application Priority Data

Oct. 20, 1997 (NL) .............................................. 1007314
Apr. 16, 1998 (NL) .............................................. 1008899

(51) Int. Cl.[7] .............................. B32B 29/00; C08J 3/00
(52) U.S. Cl. ................................ 428/537.5; 428/308.8; 428/141; 428/413; 428/423.1; 428/425.1; 428/481; 524/9; 524/13; 524/34; 264/464
(58) Field of Search ........................... 428/308.8, 537.5, 428/413, 423.1, 425.1, 481, 141; 524/9, 34, 13; 264/464

(56) References Cited

FOREIGN PATENT DOCUMENTS

| | | | |
|---|---|---|---|
| DE | 44 293 55 | * | 1/1996 |
| EP | 0565013 | * | 10/1993 |
| GB | 2030504 | * | 4/1980 |
| WO | 90/13403 | * | 11/1990 |
| WO | 93/19917 | * | 10/1993 |
| WO | 99/20444 | * | 4/1999 |

* cited by examiner

Primary Examiner—Samuel A. Acquah
(74) Attorney, Agent, or Firm—Seed Intellectual Property Law Group PLLC

(57) ABSTRACT

The present invention relates to a molded element, in particular in the form of a plate, which comprises a compressed mixture of binder and filler. In addition to that, the present invention relates to a method and a device for manufacturing a molded element, in particular a plate, wherein a mixture comprising binder and filler is compressed and heated. The present invention furthermore relates to floor plates, a sports hall provided with such floor plates, promotional gifts, ceiling plates, furniture and objects of art.

27 Claims, No Drawings

MOULDED ELEMENT, IN PARTICULAR IN THE SHAPE OF A PLATE, WHICH IS A COMPRESSED MIXTURE OF BINDER AND FILLER, A METHOD AND A DEVICE FOR MANUFACTURING SUCH A MOULDED ELEMENTS, AS WELL AS FLOOR PLATES, A SPORTS HALL PROVIDED WITH SUCH FLOOR

The present invention relates to a moulded element, in particular in the form of a panel or plate, which comprises a compressed mixture of binder and filler. The present invention furthermore relates to a method and a device for manufacturing a moulded element, in particular a plate, wherein a mixture comprising binder and filler is compressed and heated. In addition to that, the present invention relates to floor plates, a sports hall provided with such floor plates, and also to ceiling plates, promotional gifts, objects of art and furniture.

A moulded element of this kind is known from European patent No. 0 338 047, wherein a granulate of hard polyurethane foam and integral foam is used as the polyurethane, whereby the amount of granulate of integral foam ranges between 10 and 99% by weight. The fillers that are mentioned are glass fibres, textile fibres, asbestos, leather and cellulose. In addition, elongated rubber particles may be used as a filler. The filler content is 50% at most. Although it is stated in Example 1 of said European patent that such a moulded element possesses properties which make it suitable for use as a plate element for floors in sports halls, the sports engineering laboratory of Stichting NOC*NSF at Papendal has declared such plates unfit for use as a sports surface, because they do not possess the required mechanical properties. In particular the elasticity of such a floor is unsuitable for indoor sports.

International patent application WO 93/19917 relates to a method for recycling polyurethane hard foam, whereby it is stated that cellulose in the form of paper and paste can be added to a content of 80%.

British patent application no. 2,030,504 relates to a fibre-reinforced material made of expanded plastics, which is intended for use in the packaging industry. Wood fibres, glass fibres and shredded paper are mentioned as examples of fibrous materials for reinforcing the material which is made from plastics.

German Offenlegungsschrift no. 44 29 355 relates to a method for manufacturing parts of the interior of cars, for example, wherein a material consisting of natural fibres is added as a reinforcing material. It is stated in column 3, lines 41–56, that scraps of paper, preferably obtained from waste paper or from industrial paper waste flows, may be used.

British patent no. 1,574,006 relates to objects in which waste paper is incorporated. The objects thus obtained may be used as construction materials, for example.

European patent application no. 0 565 013 relates to a plate material based on paper and to a method of manufacturing same. The only paper source that is mentioned therein is waste paper.

International patent application WO 90/13403 relates to a method for manufacturing a flat moulded element made from a synthetic resin, in which cellulose-like materials are incorporated.

In addition to that it has been proposed to use residual paper as a filler, but it was considered impossible to use paper in view of the moisture absorption by the paper, which would make the material unsuitable for incorporation in such plates. In view of the large amounts of banknotes that will become available the next few years as a result of the introduction of a new currency in Europe, it is desirable to find a useful destination for these banknotes.

The object of the present invention is to provide a moulded element, in particular in the shape of a plate, which does not exhibit the above drawbacks. In addition to that it is desirable to provide an application which constitutes a technically and economically sound solution for the problem of finding a way to recycle used bank-paper in an efficient manner.

According to the present invention, the moulded element as referred to in the introduction is characterized in that banknotes are used as a filler.

The moulded element obtained according to the present invention is suitable for use as a floor element, in particular for sports surfaces, as an element for manufacturing furniture, doors, ceiling elements and wall elements, whereby said moulded element is in particular suitable for use as a constructional element for building purposes. Another application of the moulded element obtained according to the present invention is in the field of objects of art, decorative products and promotional gifts, such as attaché-cases, serving trays, birdhouses and the like. The present moulded element is in particular suitable for applications where usually wooden elements, chipboards and compressed plates are used, whereby said materials can be substituted for the moulded element obtained according to the present invention, which is characterized in that it comprises banknotes as a filler.

In a preferred embodiment of the moulded element according to the invention, ground, shredded banknotes are used as a filler. The use of shredded banknotes ensures that a homogeneous mixture of binder and filler is produced, so that a homogeneous moulded element is obtained after a heat treatment under compression.

The percentage of banknotes generally ranges between 20 and 98% by weight, in particular 25–95% by weight, preferably 40–80% by weight, in particular 50–75% by weight, based on the weight of the eventual moulded element. If the percentage of banknotes in the eventual moulded element is lower than 20% by weight, the mechanical properties that are obtained will be inadequate. In addition, the cost price of the eventual moulded element will become higher when the percentage of banknotes is small, which is undesirable in practice. If the percentage of banknotes in the moulded element is higher than 98% by weight, the eventual moulded element will be unsuitable for use as, for example, a plate for sports surfaces. Experiments have shown that in particular a high E-modulus, which parameter is important for sports surfaces, is obtained if the percentage of banknotes is 50–75% by weight. For other applications, such as furniture, wall elements, ceiling elements and the like, wherein the E-modulus is not a decisive parameter, the percentage of banknotes is preferably 40–80% by weight, based on the weight of the eventual moulded element. An especially desirable moulded element is composed of 94% by weight of banknotes and 6% by weight of binder. In certain embodiments it is moreover desirable to use one or more usual fillers which are known in the art, for example talc, carbon black, silicon dioxide and the like, in addition to the banknotes which make up the present filler. It should be understood, however, that the intended use of the eventual moulded element determines the special banknotes—binder ratio, whereby the percentage of banknotes according to the invention preferably ranges between 20 and 98% by weight.

The binder to be used is not particularly critical. Suitable binders are for example compounds containing isocyanate groups, mineral binders, thermosetting binders, such as melamine resins and phenol resins, polyester resins and epoxy resins. Such binders may be used alone or in a mixture thereof, whereby it is preferred in some embodiments that initiators are present. In certain embodiments it is preferred to use one or more solvents, in order to improve the flow characteristics of the mixture of binder and filler. Furthermore, it is in particular preferred to use a compound containing isocyanate groups as a binder, so that a uniform moulded element is obtained after a heat treatment under compression.

In a special embodiment of the moulded element according to the present invention, it is preferred to add polyurethane to the mixture of binder and banknotes. Polyurethane has a positive effect on the integrity of the eventual moulded element, whereby the amount of polyurethane is in particular not limited. Generally the amount of banknotes will range between 20 and 98% by weight, preferably between 40 and 80% by weight, in particular between 50 and 75% by weight, based on the weight of the eventual moulded element, whereby the remaining amount consists of binder, polyurethane and furthermore one or more additives, as will be described hereafter.

The moulded element according to the present invention may furthermore contain one or more additives selected from the group consisting of pigments, fire-retardants, plasticizers, stabilizers, and agents which protect against UV-radiation. As already said before, the moulded element according to the present invention may also contain one or more of the fillers which are known in the art in addition to the banknotes which make up the present filler.

The present invention furthermore relates to a method for manufacturing a moulded element, in particular a plate, wherein a mixture comprising binder and filler is compressed and heated, which method is according to the invention characterized in that a layer of the mixture is applied to a first substrate, after which a second substrate is placed on top of the first substrate on which said mixture is present, and in that the assembly of first substrate, mixture and second substrate thus obtained is subjected to a heat treatment under compression so as to form the moulded element.

In a preferred embodiment of the method according to the invention, at least one of the substrate layers is removed after said heat treatment under compression, in particular both substrate layers are removed. According to such a follow-up treatment, the moulded element that is obtained is directly suitable for further use, for example as a floor element. It is preferred to carry out the removal of such substrate layers by grinding, milling and/or scouring, because the substrate can be removed very precisely in this manner without damaging the eventual moulded element.

In a preferred embodiment of the method according to the invention, paper is used as a substrate. The use of paper as a substrate layer enables easy removal of the substrate following the heat treatment under compression by simply grinding, milling and/or scouring. Moreover, the mixture of binder, banknotes, possibly polyurethane and one or more additives, as already disclosed, provides a proper bond to the paper substrate. In another embodiment it is preferred to use a plastic foil as a substrate. Such a foil possesses a good resistance to heating, and consequently it is not susceptible to the formation of tears or cracks during the heat treatment. In addition, such a foil improves the surface structure of the starting mixture to be cured. Suitable substrate materials are furthermore laminate materials, for example HPL (High Pressure Laminates) and CPL (Continuous Pressing Laminates), melamine resins, metal foils and the like. Such substrate materials are used in particular for the purpose of improving the surface of the eventual moulded element. Thus it is possible according to the present invention to use a substrate having a specific structure, for example a relief pattern. The relief pattern of the substrate will be transferred to the surface of the moulded element, so that the moulded element can be given special decorative aspects. After the substrate has been removed from the moulded element, said moulded element is cut into separate moulded elements. The moulded elements thus cut are suitable for use as a plate element for sports surfaces, for example.

The present invention furthermore relates to a device for manufacturing a moulded element, in particular a plate, which device consists of a compression and heating unit and a unit for supplying starting material, and the present device is characterized in that it comprises at least one unit for supplying substrate to the compression and heating unit, whereby the unit for supplying starting material is positioned so that the starting material is applied to the substrate being supplied before said compression and heat treatment in said compression and heating unit takes place. The present device preferably comprises two units for supplying substrate, wherein the first substrate unit provides the first substrate on which the starting material is present, and the second substrate unit provides the second substrate which is placed on top of the first substrate on which starting material is present. Furthermore, the invention preferably comprises a unit for removing substrate, in which unit a grinding, scouring or milling operation is carried out. A preferred embodiment of the device according to the present invention moreover comprises a cutting unit, in which the moulded element, from which the substrate has been removed, is cut into separate moulded elements. It should be understood that in certain embodiments the supply unit for starting material is provided with mixing elements which function to maintain a homogeneous mixture of starting materials. Such a mixture comprises binder and filler, in particular banknotes, to which one or more special components as described in detail above are added.

The present invention furthermore relates to a sports hall comprising a floor which is built up of plates, which floor is according to the present invention characterized in that it is composed of moulded elements according to the present invention. It is also possible, however, to use the moulded element according to the present invention as a decorative or constructional element in for example a domestic environment, namely as a floor in a kitchen or as a wall element or a ceiling element. The present moulded element is in particular suitable for being used as a kitchen work top. Decorative uses are for example promotional gifts, serving trays and furniture. The present moulded element is furthermore in particular suitable for making objects of art thereof.

The present invention will be explained in more detail hereafter by means of special examples. It should be understood, however, that the present invention is by no means limited to said special examples and the uses mentioned therein.

EXAMPLE 1

A moulded element consisting of 94% by weight of banknotes and 6% by weight of a binder based on a compound containing isocyanate groups was manufactured by compression and heating. The plate thus produced was especially suitable for being used for constructional purposes wherein formerly wooden elements were used, such as cabinets, tabletops and the like.

EXAMPLE 2

A moulded element consisting of 75% by weight of shredded banknotes and a total amount of 25% by weight of polyurethane and a binder based on a compound containing isocyanate groups was manufactured as follows. A mixture of 75% by weight of shredded banknotes, 25% by weight of polyurethane and binder was continuously applied in a layer to a paper substrate. The paper substrate provided with the mixture of polyurethane, binder and banknotes was then supplied to a compression unit, whereby the mixture was covered on the upper side with a paper upper layer. In the compression unit, the assembly of paper substrate, mixture and paper upper layer was heated to a temperature at which crosslinking of polyurethane takes place. After proper crosslinking of the polyurethane had taken place, the aggregate was kept for 24 hours, after which a rigid moulded element was obtained. After cooling, the paper layers were removed from the moulded element thus obtained, in particular a plate, by milling, grinding and scouring, after which the element was cut into floor elements. A number of mechanical properties of the moulded element thus produced were determined, which mechanical properties were compared with those of a number of commercially available plates. The results of said testing are shown in Table 1. The commercially available plates are indicated by letters A, B, C and D respectively.

TABLE 1

| | measuring results | | | | |
|---|---|---|---|---|---|
| Parameter | Plate A | Plate of example 1 | Plate B | Plate C | Plate D |
| E-modulus [N/mm$^2$] | 497.4 | 2437.2 | 1226.9 | 1357.0 | 1208.0 |
| F-fracture [N] | 61.9 | 169.0 | 104.6 | 101.9 | 53.6 |
| elongation upon fracture [%] | 1.5 | 1.1 | 1.5 | 1.4 | 1.3 |
| flexural strength [N/mm$^2$] | 7.5 | 22.8 | 17.1 | 16.7 | 8.8 |

The table above clearly shows that the E-modulus of the plate according to the present invention is considerably higher than the E-modulus of the commercially available plates A–D. Moreover, the values for elongation upon fracture and flexural strength of the plate according to the present invention are significantly better than those of the commercially available plates A–D.

EXAMPLE 3

This example was carried out in order to determine the influence of the percentage of banknotes on a number of mechanical properties of the eventual moulded element. Moulded elements were made containing an amount of banknotes of 0, 25, 50, 75 and 100%. If the amount of banknotes is for example 25%, the remaining amount will be 75%, which remaining amount consists of polyurethane, binder and possibly one or more additives known from the prior art. In addition to that, a plate was manufactured of 94% banknotes and 6% binder containing isocyanate groups, in particular PMDI. In the table below, the mechanical properties of moulded elements in which banknotes are incorporated are compared with those of commercially available chipboard and MDF board.

TABLE 2

| Plate characteristics | | Unit | 6% PMDI-binder 94% Banknotes | MDF-board | Chip-board | Banknotes 100% | Banknotes 75% * | Banknotes 50% * | Banknotes 25% * | Banknotes 0% * |
|---|---|---|---|---|---|---|---|---|---|---|
| Thickness | | mm | 8.3 | 8.0 | 7.0 | 6.4 | 7.0 | 7.2 | 7.1 | 7.2 |
| Residual moisture content | | % | 2.8 | 6.5 | 6.5 | — | — | — | — | — |
| Density | | kg/mm$^3$ | 1180 | 845 | 797 | 1145 | 960 | 990 | 890 | 835 |
| Flexural strength | lengthwise upper side | N/mm$^2$ | 36.3 | 47.6 | 22.7 | 36.2 | 21.5 | 26.6 | 20.2 | 15.8 |
| | lengthwise lower side | N/mm$^2$ | 42.3 | | | | | | | |
| | crosswise upper side | N/mm$^2$ | 37.3 | | | | | | | |
| | crosswise lower side | N/mm$^2$ | 48.4 | | | | | | | |
| E-modulus | lengthwise upper side | N/mm$^2$ | 4785 | 3970 | 3506 | 4707 | 2372 | 2407 | 1633 | 1030 |
| | lengthwise lower side | N/mm$^2$ | 5325 | | | | | | | |
| | crosswise upper side | N/mm$^2$ | 4890 | | | | | | | |
| | crosswise lower side | N/mm$^2$ | 5935 | | | | | | | |
| Transverse tensile strength | | N/mm$^2$ | 2.1 | 1.22 | 1.27 | 1.88 | 2.48 | 2.70 | 2.36 | 2.89 |
| Swelling after 2 hours | | % | 4.9 | 2.0 | 1.3 | 6.8 | 3.1 | 2.4 | 3.1 | 0.9 |
| Swelling after 24 hours | | % | 10.1 | 14.5 | 7.3 | 17.3 | 7.6 | 4.6 | 4.8 | 1.3 |
| Water absorption after 2 hours | | % | 3.5 | 3.9 | 4.3 | 5.7 | 4.7 | 2.8 | 3.6 | 3.4 |
| Water absorption after 24 hours | | % | 11.0 | 26.2 | 23.4 | 22.0 | 16.2 | 8.9 | 12.9 | 9.2 |

Note:
* = The remaining amount to 100% is made up of a mixture of one or more components comprising binder, polyurethane and additives.

The plate containing 94% by weight of banknotes exhibits a substantially higher flexural strength, E-modulus and transverse tensile strength than the commercially available chipboard. In addition, the E-modulus of such a plate is substantially higher than the E-modulus of the commercially available MDF board. By reducing the amount of banknotes and using polyurethane, the extent of swelling of the eventual moulded element will decrease. It is supposed that such an effect is caused by crosslinking reactions between the components, but the present inventors are not bound by such an explanation. From Table 2 it can furthermore be concluded that a moulded element containing 100% banknotes exhibits a large moisture absorption, after 2 hours and 24 hours. This means that such a moulded element is not suitable for use in moist conditions. From Table 2 it is furthermore apparent that a moulded element which contains 50% banknotes and 50% of a mixture of polyurethane, binder and one or more known additives, exhibits an excellent flexural strength and E-modulus and a low moisture absorption in comparison with commercially available chipboard and MDF-board. Such a moulded element is in particular suitable for use as a floor element for indoor sports.

What is claimed is:

1. A moulded element, in the form of a plate, which comprises a compressed mixture of binder and filler, wherein banknotes are used as a filler.

2. A moulded element according to claim 1, wherein ground, shredded banknotes are used as a filler.

3. A moulded element according to claim 1, wherein the percentage of banknotes ranges between 20 and 98% by weight, based on the weight of the eventual moulded element.

4. A moulded element according to claim 3, wherein the percentage of banknotes ranges between 25 and 95% by weight, based on the weight of the eventual moulded element.

5. A moulded element according to claim 4, wherein the percentage of banknotes is 94% by weight, based on the weight of the eventual moulded element.

6. A moulded element according to claim 3, wherein the percentage of banknotes ranges between 40 and 80% by weight, based on the weight of the eventual moulded element.

7. A moulded element according to claim 6, wherein the percentage of banknotes ranges between 50 and 75% by weight, based on the weight of the eventual moulded element.

8. A moulded element according to claim 1, wherein one or more binders are selected from the group consisting of compounds containing isocyanate groups, mineral binders, thermosetting binders, polyester resins, and epoxy resins.

9. A moulded element according to claim 8, wherein a compound containing isocyanate groups is used as a binder.

10. A moulded element according to claim 1, wherein the compressed mixture of filler and binder contains polyurethane.

11. A moulded element according to claim 1, wherein the compressed mixture furthermore contains one or more additives selected from the group consisting of pigments, fire-retardants, plasticizers, stabilizers, and agents which protect against UV-radiation.

12. A method for manufacturing a moulded element, wherein a layer of a mixture comprising binder and filler is applied to a first substrate, after which a second substrate is placed on top of the first substrate on which said mixture is present, and in that the assembly of first substrate, mixture and second substrate thus obtained is subjected to a heat treatment under compression so as to form the moulded element, characterized in that a moulded element according to claim 1 is manufactured.

13. A method according to claim 12, wherein at least one of the substrate layers is removed following said heat treatment under compression.

14. A method according to claim 13, wherein both substrate layers are removed following said heat treatment under compression.

15. A method according to claim 13, wherein said removing operation is carried out by grinding, milling and/or scouring.

16. A method according to claim 12, wherein paper is used as a substrate.

17. A method according to claim 12, wherein a plastic foil is used as a substrate.

18. A method according to claim 12, wherein a metal foil is used as a substrate.

19. A method according to claim 12, wherein at least one of the two substrates has such a structure that said structure is transferred to the surface of the moulded element.

20. A method according to claim 13, wherein said moulded element, from which the substrate has been removed, is cut into separate moulded elements.

21. Floor plates, characterized in that said floor plates are composed of a moulded element according to claim 1.

22. A sports hall comprising a floor, wherein said floor is composed of floor plates according to claim 21.

23. Promotional gifts, wherein said promotional gifts are composed of a moulded element according claim 1.

24. Furniture, wherein said furniture is composed of a moulded element according to claim 1.

25. Ceiling plates, wherein said ceiling plates are composed of a moulded element according to claim 1.

26. Objects of art, wherein said objects of art are composed of a moulded element according to claim 1.

27. Moulded element according to claim 8 wherein the binder further comprises initiators.

* * * * *